US009523525B2

(12) United States Patent
Nakai et al.

(10) Patent No.: US 9,523,525 B2
(45) Date of Patent: Dec. 20, 2016

(54) REFRIGERATING DEVICE

(71) Applicant: DAIKIN INDUSTRIES, LTD., Osaka-shi, Osaka (JP)

(72) Inventors: Akinori Nakai, Kusatsu (JP); Daisuke Toyoda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/407,034

(22) PCT Filed: Jun. 10, 2013

(86) PCT No.: PCT/JP2013/065935
§ 371 (c)(1),
(2) Date: Dec. 10, 2014

(87) PCT Pub. No.: WO2013/187352
PCT Pub. Date: Dec. 19, 2013

(65) Prior Publication Data
US 2015/0135754 A1 May 21, 2015

(30) Foreign Application Priority Data

Jun. 13, 2012 (JP) .................................. 2012-133931

(51) Int. Cl.
| F28B 9/00 | (2006.01) |
| F25D 17/00 | (2006.01) |
| F25B 41/04 | (2006.01) |
| F25B 41/00 | (2006.01) |
| F25B 49/02 | (2006.01) |
| F25B 13/00 | (2006.01) |
| F25B 49/00 | (2006.01) |
| G01K 13/02 | (2006.01) |

(52) U.S. Cl.
CPC ............. *F25B 49/022* (2013.01); *F25B 13/00* (2013.01); *F25B 49/005* (2013.01); *G01K 13/02* (2013.01);
(Continued)

(58) Field of Classification Search
CPC .................... F25B 49/022; F25B 2700/21152; F25B 49/025; F25B 49/027; F04C 2270/19; H02H 7/0852; B60H 1/3225
(Continued)

(56) References Cited

U.S. PATENT DOCUMENTS

| 4,220,010 A | * | 9/1980 | Mueller | .................. F25B 13/00 |
| | | | | 417/32 |
| 5,381,669 A | * | 1/1995 | Bahel | .................... F25B 49/005 |
| | | | | 62/129 |

(Continued)

FOREIGN PATENT DOCUMENTS

| JP | 10-246495 A | 9/1998 |
| JP | 2001-355928 A | 12/2001 |

(Continued)

OTHER PUBLICATIONS

International Search Report of corresponding PCT Application No. PCT/JP2013/065935 dated Jul. 30, 2013.
(Continued)

*Primary Examiner* — Marc Norman
*Assistant Examiner* — Henry Crenshaw
(74) *Attorney, Agent, or Firm* — Global IP Counselors

(57) ABSTRACT

A refrigerating device includes a refrigerant circuit, a temperature detecting unit, a protection control section, and a determination temperature modifying section. The refrigerant circuit includes a compressor to compress a refrigerant. The temperature detecting section detects a temperature of the refrigerant discharged from the compressor on an outside of the compressor. The protection control section performs protection control of the compressor in a case where a detection temperature detected by the temperature detecting section exceeds a determination temperature. The determination temperature modifying section modifies the determi- (Continued)

nation temperature according to at least one of information on an outside air temperature and information on a type of the refrigerant.

5 Claims, 6 Drawing Sheets

(52) U.S. Cl.
CPC .. *F25B 2313/006* (2013.01); *F25B 2313/0233* (2013.01); *F25B 2313/02741* (2013.01); *F25B 2600/025* (2013.01); *F25B 2600/23* (2013.01); *F25B 2600/2513* (2013.01); *F25B 2700/2106* (2013.01); *F25B 2700/21152* (2013.01)

(58) Field of Classification Search
USPC ...................................................... 62/228.4
See application file for complete search history.

(56) References Cited

U.S. PATENT DOCUMENTS

| | | | | |
|---|---|---|---|---|
| 6,240,733 | B1* | 6/2001 | Brandon | F25B 49/005 62/129 |
| 6,401,457 | B1* | 6/2002 | Wang | F02B 37/18 123/568.21 |
| 6,581,397 | B1 | 6/2003 | Taira et al. | |
| 8,418,483 | B2* | 4/2013 | McSweeney | F25B 49/022 62/126 |
| 2003/0014951 | A1* | 1/2003 | Crouse | B01D 45/06 55/322 |
| 2004/0237550 | A1 | 12/2004 | Yamasaki et al. | |
| 2005/0235660 | A1* | 10/2005 | Pham | 62/126 |
| 2006/0171822 | A1* | 8/2006 | Seagar et al. | 417/410.1 |
| 2009/0119036 | A1* | 5/2009 | Jayanth et al. | 702/60 |
| 2010/0101247 | A1* | 4/2010 | Lifson et al. | 62/115 |
| 2012/0234030 | A1* | 9/2012 | Hagita et al. | 62/129 |

FOREIGN PATENT DOCUMENTS

| | | |
|---|---|---|
| JP | 2002-107016 A | 4/2002 |
| JP | 2011-52872 A | 3/2011 |

OTHER PUBLICATIONS

International Preliminary Report of corresponding PCT Application No. PCT/JP2013/065935 dated Feb. 12, 2015.
European Search Report of corresponding EP Application No. 13 80 3469.9 dated Jul. 27, 2015.

* cited by examiner

|  | R32 | | R410A | |
|---|---|---|---|---|
|  | To>Tob | To≦Tob | To>Tob | To≦Tob |
| f>fb | COMBINATION 1 | COMBINATION 3 | COMBINATION 5 | COMBINATION 7 |
| f≦fb | COMBINATION 2 | COMBINATION 4 | COMBINATION 6 | COMBINATION 8 |

FIG. 3

REFRIGERATING DEVICE

CROSS-REFERENCE TO RELATED APPLICATIONS

This U.S. National stage application claims priority under 35 U.S.C. §119(a) to Japanese Patent Application No. 2012-133931, filed in Japan on Jun. 13, 2012, the entire contents of which are hereby incorporated herein by reference.

TECHNICAL FIELD

The present invention relates to a refrigerating device.

BACKGROUND ART

A configuration for a refrigerating device is known where, in order to prevent breakages and lower performance of a compressor which configures a refrigerant circuit due to overheating, a temperature of a discharge pipe of the compressor is monitored and a protection control is performed on the compressor in a case where this temperature is larger than a determination temperature.

Here, to protect the compressor, it is more desirable to monitor the temperature inside the compressor which has a higher temperature than the temperature of the discharge pipe, in more detail, to monitor the temperature of refrigerant immediately after being discharged from a compression chamber (the temperature of a discharge port) or the temperature of a motor, than to monitor the temperature of the discharge pipe of the compressor. However, since there are difficulties in that arranging a temperature detector inside the compressor because of the hike of the manufacturing cost, a determination temperature is set on the premise that there is a fixed difference in temperatures between the temperature of the inside of the compressor and the temperature of the discharge pipe and the protection control is performed using the temperature of the discharge pipe of the compressor.

Here, in a case where an inverter compressor is used, the difference in temperatures between the temperature of the inside of the compressor and the temperature of the discharge pipe may change since there are changes in the circulating amount of refrigerant. With regard to this, a configuration is disclosed in Japanese Unexamined Patent Application Publication No. 2002-107016 where the determination temperature is modified according to the driving frequency of the inverter compressor (the circulating amount of refrigerant).

SUMMARY

Problems to be Solved by the Invention

However, the inventor of the present application found that the difference in temperatures between the temperature of the inside of the compressor and the temperature of the discharge pipe may change according to an outside air temperature and a type of refrigerant which is being used in the refrigerating device as well as cases where the driving frequency of inverter compressor is different.

The object of the present invention is to provide a highly reliable refrigerating device where appropriate protection control is performed regardless of an outside air temperature or a type of refrigerant which is being used in the refrigerating device in a case where the temperature of the refrigerant is measured outside a compressor and the protection control is performed based on this temperature.

Means to Solve the Problems

A refrigerating device according to a first aspect of the present invention is provided with a refrigerant circuit, a temperature detecting section, a protection control section, and a determination temperature modifying section. The refrigerant circuit includes a compressor which compresses a refrigerant. The temperature detecting section detects the temperature of the refrigerant which is discharged from the compressor outside the compressor. The protection control section performs protection control for the compressor in a case where the detection temperature which is detected by the temperature detecting section exceeds a determination temperature. The determination temperature modifying section modifies the determination temperature according to information on an outside air temperature and/or information on a type of the refrigerant.

Here, the determination temperature, which is a reference for determining whether or not to start performance of protection control, is modified according to the outside air temperature and/or the type of refrigerant. For this reason, the protection control is performed based on the determination temperature which is appropriate even in a case where the difference in temperatures between the temperature of the inside of the compressor and the temperature of refrigerant which is detected outside the compressor changes due to the outside air temperature or the type of refrigerant. As a result, a highly reliable refrigerating device is realized.

A refrigerating device according to a second aspect of the present invention is the refrigerating device according to the first aspect of the present invention where the determination temperature modifying section modifies the determination temperature to be a smaller value as the outside air temperature falls.

Here, appropriate protection control is performed regardless of the outside air temperature before the inside of the compressor overheats since the determination temperature is modified to be a smaller value in a case where the outside air temperature falls and there is an increase in the difference in temperatures between the temperature of the inside of the compressor and the temperature of refrigerant outside the compressor. As a result, a highly reliable refrigerating device is realized.

A refrigerating device according to a third aspect of the present invention is the refrigerating device according to the first aspect of the present invention where the determination temperature modifying section modifies the determination temperature to be a smaller value as a ratio of specific heat of the refrigerant is larger.

Here, the determination temperature is modified to be a smaller value as the ratio of specific heat of the refrigerant is larger. In general, the difference in temperatures between the temperature of the inside of the compressor and the temperature of refrigerant outside the compressor is larger as the ratio of specific heat of the refrigerant is larger. The appropriate protection control therefore can be performed regardless of the type of refrigerant before the inside of the compressor overheats by modifying the determination temperature to be a smaller value as the ratio of specific heat of the refrigerant is larger. As a result, a highly reliable refrigerating device is realized.

A refrigerating device according to a fourth aspect of the present invention is the refrigerating device according to any one of the first aspect to the third aspect of the present invention where the compressor is an inverter control compressor being capable of varying a driving frequency. The determination temperature modifying section further modifies the determination temperature according to the driving frequency.

Here, the determination temperature is modified according to the driving frequency of the inverter control compressor. The difference in temperatures between the temperature of the inside of the compressor and the temperature of refrigerant outside the compressor changes according to the driving frequency since the amount of refrigerant circulating in the compressor changes according to the driving frequency of the compressor. However, since the determination temperature is modified according to the driving frequency, appropriate protection control is performed before the inside of the compressor overheats. As a result, a highly reliable refrigerating device is realized.

A refrigerating device according to a fifth aspect of the present invention is the refrigerating device according to the fourth aspect of the present invention where the refrigerant circuit further includes an expansion valve where an opening degree is adjustable. The determination temperature includes a first determination temperature, a second determination temperature which is larger than the first determination temperature, and a third determination temperature which is larger than the second determination temperature. The protection control section reduces the driving frequency of the compressor in a case where the detection temperature exceeds the first determination temperature, increases the opening degree of the expansion valve in a case where the detection temperature exceeds the second determination temperature, and stops the compressor in a case where the detection temperature exceeds the third determination temperature.

Here, since the content of the protection control is changed according to the detection temperature based on the determination temperature which is appropriately set, it is possible to realize more precise protection control according to the circumstances and a highly reliable refrigerating device which is realized.

Effects of the Invention

In the refrigerating device according to the first aspect of the present invention, the determination temperature, which is a reference for determining whether or not to start performance of protection control, is modified according to the outside air temperature and/or the type of refrigerant. For this reason, the protection control is performed based on the determination temperature which is appropriate even in a case where the difference in temperatures between the temperature of the inside of the compressor and the temperature of refrigerant which is detected outside the compressor changes due to the outside air temperature or the type of refrigerant. As a result, a highly reliable refrigerating device is realized.

In the refrigerating device according to the second aspect and third aspect of the present invention, it is possible to perform the protection control based on the appropriate determination temperature and to realise a highly reliable refrigerating device since the determination temperature is modified to be a smaller value in a case where the difference in temperatures between the temperature of the inside of the compressor and the temperature of refrigerant which is detected outside the compressor becomes larger.

In the refrigerating device according to the fourth aspect of the present invention, the determination temperature is modified in a case where the driving frequency of the inverter control compressor changes and there is a change in the difference in temperatures between the temperature of the inside of the compressor and the temperature of refrigerant which is detected outside the compressor. As a result, it is possible to perform protection control based on the appropriate determination temperature and to realise a highly reliable refrigerating device.

In the refrigerating device according to the fifth aspect of the present invention, since the content of protection control is changed according to the detection temperature based on the determination temperature which is appropriately set, it is possible to realize more precise protection control according to the circumstances and the refrigerating device which is highly reliable is realized.

BRIEF DESCRIPTION OF THE DRAWINGS

FIG. 3 is a diagram for explaining information which is stored in a temperature data memory area in the air conditioning device in FIG. 1.

DESCRIPTION OF EMBODIMENTS

An embodiment of the present invention will be described below with reference to the drawings. It is possible for the embodiment of the present invention described below to be appropriately modified within a scope which does not depart from the gist of the present invention.

(1) Overall Configuration

An air conditioning device 1 which is an embodiment of a refrigerating device according to the present invention is able to switch the operation between cooling operation and heating operation.

Figure 1:
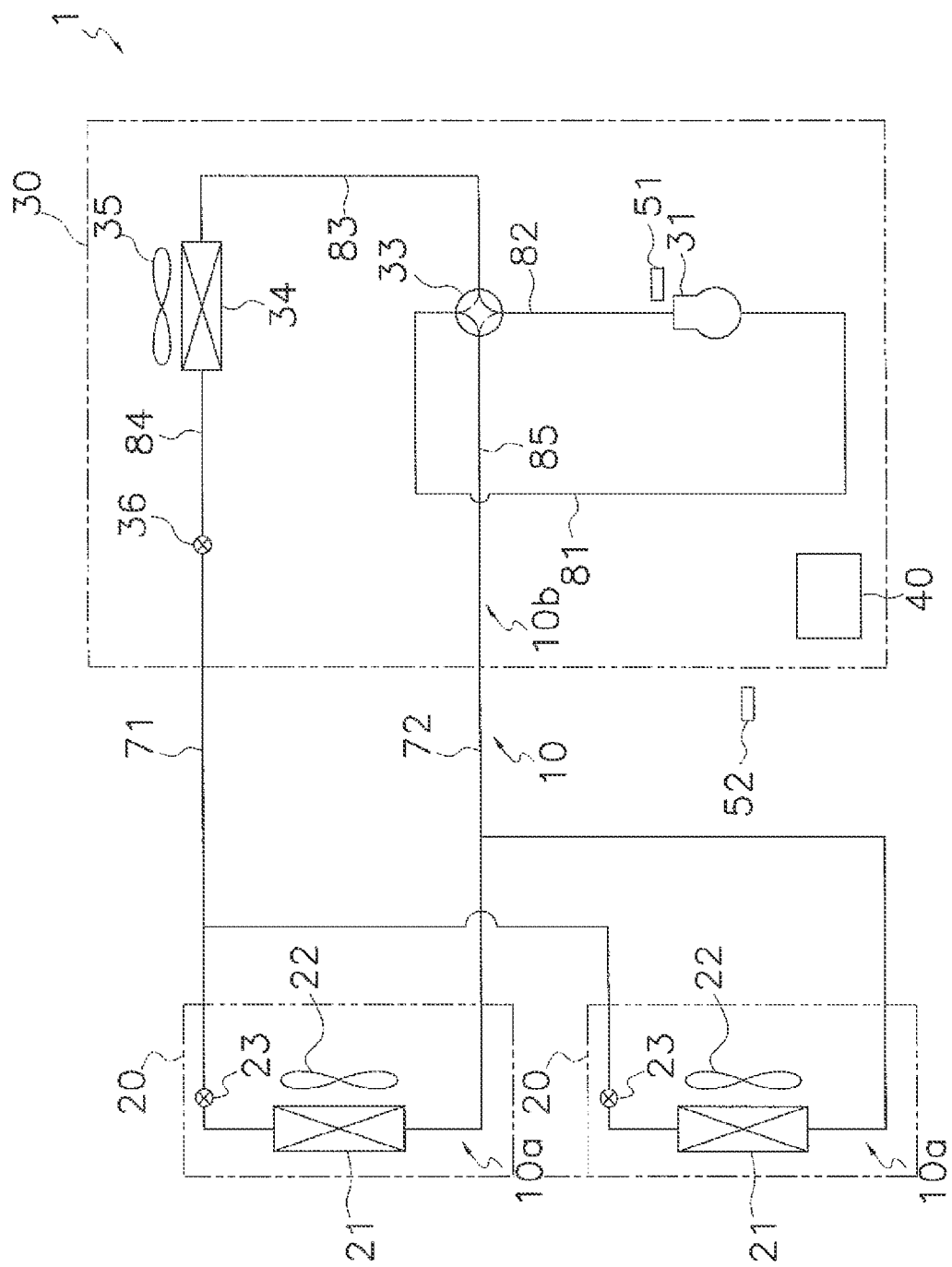
FIG. 1 is a schematic configuration diagram of an air conditioning device according to an embodiment of the present invention.

The air conditioning device 1 mainly has indoor units 20, an outdoor unit 30, a control unit 40, and an outside air temperature sensor 52 which measures the outside air temperature as shown in FIG. 1. Here, there are two of the indoor units 20 in FIG. 1, but there may be three or more, or there may be only one.

The air conditioning device 1 has a refrigerant circuit 10 which is filled with a refrigerant. The refrigerant circuit 10 has indoor side circuits 10a which are accommodated in the indoor units 20 and an outdoor side circuit 10b which is accommodated in the outdoor unit 30. The indoor side circuits 10a and the outdoor side circuit 10b are connected with a liquid refrigerant communication piping 71 and a gas refrigerant communication piping 72.

Here, it is possible for the air conditioning device 1 to use the two types, R410A or R32, as the refrigerant. Specifically, by specifying the type of refrigerant being used through an input section 43 in the control unit 40 which will be described later, operating conditions are modified by the control unit 40 and an operation suitable for the refrigerant being used is performed.

(2) Detailed Configuration (2-1) Indoor Unit

The indoor units 20 are arranged in indoor areas which are the target for air conditioning. The indoor unit 20 has an indoor heat exchanger 21, an indoor fan 22, and an indoor expansion valve 23.

The indoor heat exchanger 21 is a cross fin type, fin and tube type heat exchanger which is configured by heat transfer pipes and a plurality of heat transfer fins. Indoor air is cooled by the indoor heat exchanger 21 functioning as an evaporator of the refrigerant during cooling operation and indoor air is heated by the indoor heat exchanger 21 functioning as a condenser of the refrigerant during heating operation. The liquid side of the indoor heat exchanger 21 is connected to the liquid refrigerant communication piping 71 and the gas side of the indoor heat exchanger 21 is connected to the gas refrigerant communication piping 72.

The indoor fan 22, which is rotated using a fan motor which is not shown in the diagrams, takes in indoor air and blows it onto the indoor heat exchanger 21 so as to promote heat exchange between the indoor heat exchanger 21 and the indoor air.

The indoor expansion valve 23 is an electric expansion valve being capable of varying an opening degree and is provided to adjust a pressure and a flow amount of the refrigerant which flows in the indoor side circuits 10*a* of the refrigerant circuit 10.

(2-2) Outdoor Unit

The outdoor unit 30 mainly has a compressor 31, a four-way switching valve 33, an outdoor heat exchanger 34, an outdoor expansion valve 36, an outdoor fan 35, and a discharge pipe temperature sensor 51. The compressor 31, the four-way switching valve 33, the outdoor heat exchanger 34, and the outdoor expansion valve 36 are connected using refrigerant piping.

(2-2-1) Connection of Components with Refrigerant Piping

Connection of the components of the outdoor unit 30 with the refrigerant piping will be described.

A suction port of the compressor 31 and the four-way switching valve 33 are connected with a suction pipe 81. A discharge port of the compressor 31 and the four-way switching valve 33 are connected with a discharge pipe 82. The four-way switching valve 33 and the gas side of the outdoor heat exchanger 34 are connected with a first gas refrigerant pipe 83. The outdoor heat exchanger 34 and the liquid refrigerant communication piping 71 are connected with a liquid refrigerant pipe 84. The outdoor expansion valve 36 is provided in the liquid refrigerant pipe 84. The four-way switching valve 33 and the gas refrigerant communication piping 72 are connected with a second gas refrigerant pipe 85.

The discharge pipe temperature sensor 51 is provided in the discharge pipe 82 in order to grasp the temperature of refrigerant which is discharged from the compressor 31.

(2-2-2) Compressor

The compressor 31 is a compressor where a compression mechanism is driven using a motor to compress the gas refrigerant. The compressor 31 is an inverter compressor where it is possible to vary a driving frequency f. The compressor 31 sucks in the gas refrigerant from the suction pipe 81 and discharges the gas refrigerant which is compressed by the compression mechanism to the discharge pipe 82 at a higher temperature and at a higher pressure. The compressor 31 is a rotary compressor but the compressor 31 is not limited to this and may be, for example, a scroll compressor.

(2-2-3) Four-way Switching Value

The four-way switching valve 33 switches the refrigerant flow direction when the operation is switched between cooling operation and heating operation in the air conditioning device 1. During cooling operation, the discharge pipe 82 and the first gas refrigerant pipe 83 are connected, and the suction pipe 81 and the second gas refrigerant pipe 85 are connected. On the other hand, during heating operation, the discharge pipe 82 and the second gas refrigerant pipe 85 are connected, and the suction pipe 81 and the first gas refrigerant pipe 83 are connected.

(2-2-4) Outdoor Heat Exchanger

The outdoor heat exchanger 34 is a cross fin type, fin and tube type heat exchanger which is configured by heat transfer pipes and a plurality of heat transfer fins. The outdoor heat exchanger 34 functions as a condenser of the refrigerant during cooling operation and functions as an evaporator of the refrigerant during heating operation by performing heat exchange with outdoor air.

(2-2-5) Outdoor Fan

The outdoor fan 35 is rotated using a fan motor which is not shown in the diagrams and takes in outdoor air into the outdoor unit 30. The outdoor air which is taken in passes through the outdoor heat exchanger 34 and is finally discharged to the outside of the outdoor unit 30. The outdoor fan 35 promotes heat exchange between the outdoor heat exchanger 34 and the outdoor air.

(2-2-6) Outdoor Expansion Valve

The outdoor expansion valve 36 is an expansion mechanism. The outdoor expansion valve 36 is an electric expansion valve being capable of varying an opening degree and is provided in order to adjust a pressure and a flow amount of refrigerant which flows in the outdoor side circuit 10*b* of the refrigerant circuit 10.

The opening degree Op of the outdoor expansion valve 36 is controlled according to an air conditioning load on the indoor unit 20 and the like by a control section 41 in the control unit 40 which will be described later. In addition, the outdoor expansion valve 36 receives an instruction from a protection control section 41*c* which will be described later and raises (increases) the opening degree Op to a prescribed opening degree Opp during execution of second protection control which will be described later.

(2-2-7) Discharge Pipe Temperature Sensor

The discharge pipe temperature sensor 51 is a thermistor for detecting the temperature of refrigerant which is discharged from the compressor 31 and is an example of a temperature detecting section. The discharge pipe temperature sensor 51 is provided at an outer section of the compressor 31 on the discharge pipe 82, in more detail, in the vicinity of the discharge port of the compressor 31. A signal which corresponds to the temperature which is detected by the discharge pipe temperature sensor 51 is transmitted to a detection signal receiving section 41*a* in the control unit 40 which will be described later.

(2-3) Outside Air Temperature Sensor

The outside air temperature sensor 52 is a thermistor which is a temperature detecting section for detecting the temperature of the outside where the outdoor unit 30 is located. A signal which corresponds to the temperature which is detected by the outside air temperature sensor 52 is transmitted to the detection signal receiving section 41a in the control unit 40 which will be described later.

(2-4) Control Unit

Figure 2:
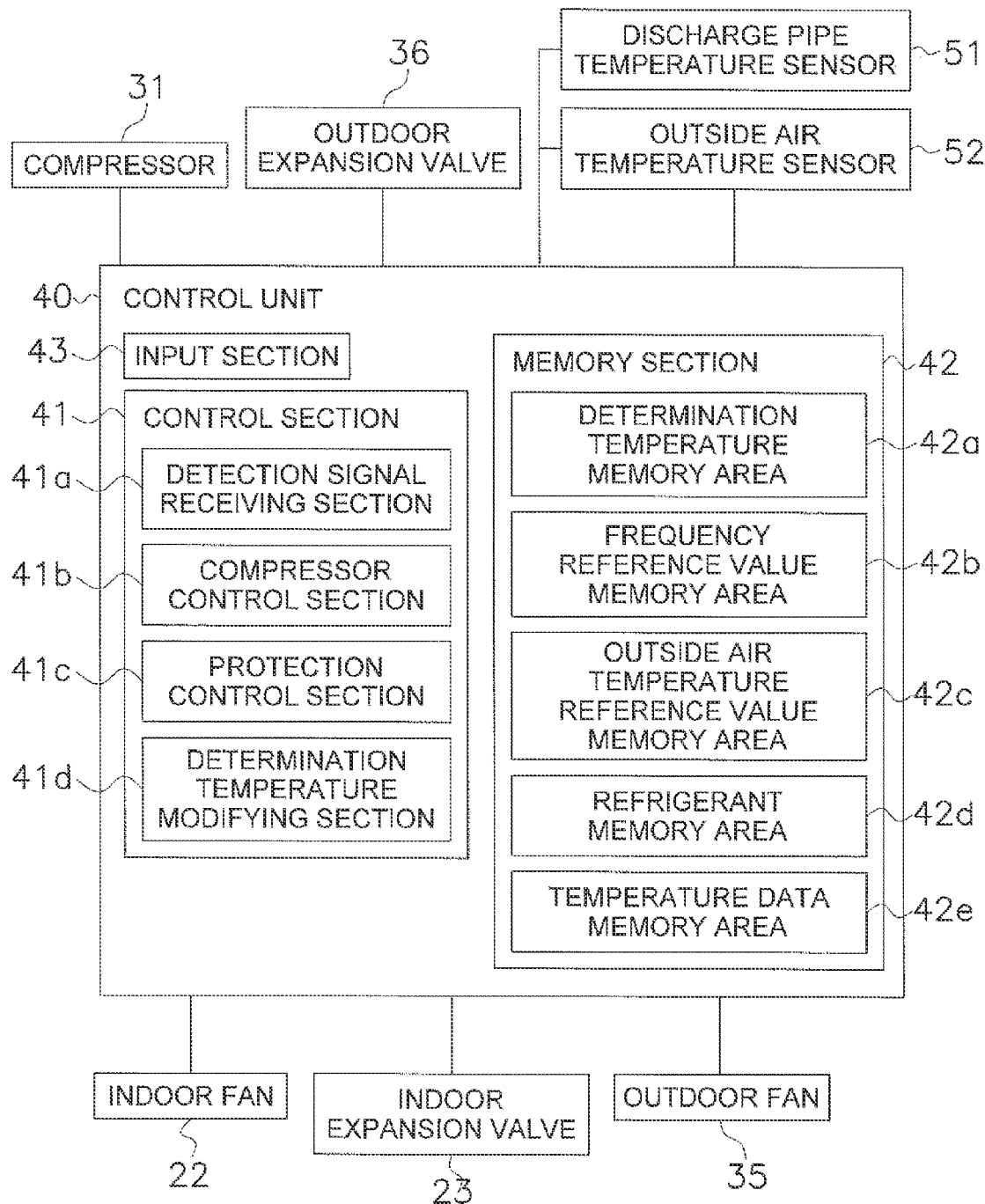
FIG. 2 is a block diagram of the air conditioning device in FIG. 1.

The control unit 40 controls the indoor units 20 and the outdoor unit 30. FIG. 2 shows a block diagram of the air conditioning device 1 which includes the control unit 40.

The control unit 40 has the control section 41 which is formed from a microcomputer or the like, a memory section 42 which is formed from a memory such as a RAM or a ROM, and the input section 43.

The control section 41 exchanges control signals with a remote controller for operating the indoor units 20, which is not shown in the diagrams, and mainly controls various components in the indoor units 20 and the outdoor unit 30 according to the air conditioning load on the indoor units 20 (for example, the difference in temperatures between the set temperature and the indoor temperature). In addition, the control section 41 functions as the detection signal receiving section 41a, a compressor control section 41b, the protection control section 41c, and a determination temperature modifying section 41d by reading out and executing programs which are stored in the memory section 42.

The memory section 42 stores the programs to be executed by the control section 41 and various types of information. The memory section 42 in particular has a determination temperature memory area 42a, a frequency reference value memory area 42b, an outside air temperature reference value memory area 42c, a refrigerant memory area 42d, and a temperature data memory area 42e.

(2-4-1) Control Section (2-4-1-1) Detection Signal Receiving Section

The detection signal receiving section 41a receives signals which are output from the discharge pipe temperature sensor 51 and the outside air temperature sensor 52. The detection signal receiving section 41a converts the signals which are received from the discharge pipe temperature sensor 51 and the outside air temperature sensor 52 respectively as a discharge pipe temperature Tt and an outside air temperature To. The discharge pipe temperature Tt is used by the protection control section 41c which will be described later in order to decide whether the protection control is performed or not and to further decide on the content of the protection control. The outside air temperature To is used in the determination temperature modifying section 41d which will be described later when a combination of first to third determination temperatures T1 to T3 is selected.

(2-4-1-2) Compressor Control Section

The compressor control section 41b decides on and controls starting, stopping and the driving frequency f of the compressor 31 according to the air conditioning load on the indoor units 20 and/or various types of control signals and the like. The driving frequency f of the compressor 31 is used in the determination temperature modifying section 41d which will be described later when a combination of the first to third determination temperatures T1 to T3 is selected.

The compressor control section 41b receives instructions from the protection control section 41c which will be described later and lowers the driving frequency f of the compressor 31 to a prescribed driving frequency fp during execution of first and second protection control which will be described later. In addition, the compressor control section b receives instructions from the protection control section 41c which will be described later and stops the operation of the compressor 31 when third protection control which will be described later is performed.

(2-4-1-3) Protection Control Section

The protection control section 41c performs protection control for the compressor 31 during the operation. More specifically, the protection control section 41c instructs performance and cancellation of three types of protection control according to the value of the discharge pipe temperature Tt. The protection control section 41c decides on the content (types) of the protection control and performance and cancellation of the protection control by comparing the discharge pipe temperature Tt and the first to third determination temperatures T1 to T3 which are stored in the determination temperature memory area 42a which will be described later. The cases are divided up and respectively described below.

Here, the first to third determination temperatures T1 to T3 have a relationship where the first determination temperature T1 is smaller than the second determination temperature T2 and the second determination temperature T2 is smaller than the third determination temperature T3.

(a) Case where Discharge Pipe Temperature Tt≤First Determination Temperature T1

The protection control section 41c decides that protection control is not to be performed.

(b) Case where First Determination Temperature T1<Discharge Pipe Temperature Tt≤Second Determination Temperature T2

First protection control, where the driving frequency f of the compressor 31 is lowered, is performed. In more detail, the protection control section 41c instructs the compressor control section 41b to lower the driving frequency f to a prescribed driving frequency fp. The driving frequency fp may be a fixed value such as a minimum value or may be a variable value, for example, which varies according to the driving frequency which is determined to be optimal from the air conditioning load on the indoor units 20 or the like.

(c) Case where Second Determination Temperature T2<Discharge Pipe Temperature Tt≤Third Determination Temperature T3

Second protection control, where the opening degree Op of the outdoor expansion valve 36 is increased in addition to lowering the driving frequency f of the compressor 31, is performed. In more detail, the protection control section 41c instructs the outdoor expansion valve 36 to raise (increase) the opening degree Op to a prescribed opening degree Opp while instructing the compressor control section 41b to lower the driving frequency f to the prescribed driving frequency fp. The opening degree Opp may also be a fixed value or a variable value in the same manner as the driving frequency fp.

(d) Case where Discharge Pipe Temperature Tt>Third Determination Temperature T3

Third protection control, where driving of the compressor 31 is stopped, is performed. In detail, the protection control section 41c instructs the compressor control section 41b to stop the compressor 31.

(2-4-1-4) Determination Temperature Modifying Section

The determination temperature modifying section 41d modifies the combination of the first to third determination temperatures T1 to T3 which are stored in the determination temperature memory area 42a according to the type of refrigerant which is being used in the air conditioning device 1, the driving frequency f of the compressor 31, and the outside air temperature To.

More specifically, the determination temperature modifying section 41d decides on one combination from among the (eight) combinations of 1) whether the type of refrigerant which is stored in the refrigerant memory area 42d which will be describe later is either R32 or R410A, 2) whether or not the driving frequency f of the compressor 31 is larger than a frequency reference value fb which is stored in the frequency reference value memory area 42b which will be described later, and 3) whether or not the outside air temperature To is larger than an outside air temperature reference value Tob which is stored in the outside air temperature reference value memory area 42c which will be described later. Then, the combination of the first to third determination temperatures T1 to T3 which corresponds to each of these combinations is called from the temperature data memory area 42e which will be described later, and by using this, the content of the determination temperature memory area 42a is modified.

(2-4-2) Memory Section (2-4-2-1) Determination Temperature Memory Area

The determination temperatures, which are used by the protection control section 41c in order to decide on whether or not protection control is to be performed and to further decide on the content of the protection control, are stored in the determination temperature memory area 42a. In more detail, the first to third determination temperatures T1 to T3 are stored in the determination temperature memory area 42a.

The first to third determination temperatures T1 to T3 which are stored in the determination temperature memory area 42a are modified (rewritten) by the determination temperature modifying section 41d according to the types of refrigerant, the driving frequency f of the compressor 31, and the outside air temperature To.

Here, a combination of the first to third determination temperatures T1 to T3, in a case where the type of refrigerant is R32, the driving frequency f of the compressor 31 is larger than the frequency reference value fb which will be described later, and the outside air temperature To is larger than the outside air temperature reference value Tob which will be described later, are stored in the determination temperature memory area 42a as initial values.

(2-4-2-2) Frequency Reference Value Memory Area

The frequency reference value fb is stored in the frequency reference value memory area 42b. The frequency reference value fb is used as a reference value when the determination temperature modifying section 41d decides on the combination of the first to third determination temperatures T1 to T3 and modifies the first to third determination temperatures T1 to T3 which are stored in the determination temperature memory area 42a.

The frequency reference value fb is a fixed value in the present embodiment, but it may be a value which can be varied by input through the input section 43 which will be described later.

(2-4-2-3) Outside air temperature Reference Value Memory Area

The outside air temperature reference value Tob is stored in the outside air temperature reference value memory area 42c. The outside air temperature reference value Tob is used as a reference value when the determination temperature modifying section 41d decides on the combination of the first to third determination temperatures T1 to T3 and modifies the first to third determination temperatures T1 to T3 which are stored in the determination temperature memory area 42a as described above.

The outside air temperature reference value Tob is a fixed value in the present embodiment, but it may a value which can be varied by input thorough the input section 43 which will be described later.

(2-4-2-4) Refrigerant Memory Area

The type of refrigerant which is being used in the air conditioning device 1 is stored in the refrigerant memory area 42d. More specifically, the type of refrigerant (R410A or R32) which is input through the input section 43 which will be described later is stored in the refrigerant memory area 42d. R32 is stored as the type of refrigerant in the refrigerant memory area 42d as an initial setting.

The operating conditions of the control unit 40 are modified according to the type of refrigerant which are stored in the refrigerant memory area 42d and an operation suitable for the refrigerant being used is performed.

(2-4-2-5) Temperature Data Memory Area

The temperature data memory area 42e stores numerical data for the first to third determination temperatures T1 to T3 to which determination temperature modifying section 41d refers when it rewrites data in the determination temperature memory area 42a. More specifically, as shown in FIG. 3, combinations 1 to 8 of the numerical data for the first to third determination temperatures T1 to T3 are stored in the temperature data memory area 42e with regard to the combinations of the type of refrigerant which is being used, whether or not the driving frequency f is larger than the frequency reference value fb, and whether or not the outside air temperature To is larger than the outside air temperature reference value Tob. Here, data is stored in advance in the temperature data memory area 42e in the present embodiment, but it may be rewritten from the input section 43 which will be described later.

The combinations of the first to third determination temperatures T1 to T3 which are stored in the determination temperature memory area 42a are set so that the respective first to third determination temperatures T1 to T3 in a case where the outside air temperature To is equal to or less than the outside air temperature reference value Tob are smaller than the respective first to third determination temperatures T1 to T3 in a case where the outside air temperature To is larger than the outside air temperature reference value Tob when the type of refrigerant which is being used and the driving frequency f are the same. That is, the respective first to third determination temperatures T1 to T3 are set to be smaller values in a case where the outside air temperature To is equal to or less than the outside air temperature reference value Tob since the discharge pipe temperature Tt easy to fall with regard to the temperature of the inside of the compressor 31 (a port temperature or a motor temperature) as the outside air temperature To falls.

In addition, the combinations of the first to third determination temperatures T1 to T3 which are stored in the determination temperature memory area 42a are set so that the respective first to third determination temperatures T1 to T3 in a case where the driving frequency f is equal to or less than the frequency reference value fb are smaller than the respective first to third determination temperatures T1 to T3 in a case where the driving frequency f is larger than the frequency reference value fb when the type of refrigerant which is being used and the outside air temperature To are the same. That is, the respective first to third determination temperatures T1 to T3 are set to be smaller values in a case where the driving frequency f is equal to or less than the frequency reference value fb since the difference in temperature between the temperature of the inside of the compressor 31 and the discharge pipe temperature Tt tend to increase when the driving frequency f is reduced due to the reduction of the amount of refrigerant which flows in the outdoor side circuit 10b.

In addition, the combinations of the first to third determination temperatures T1 to T3 which are stored in the determination temperature memory area 42a are set so that the respective first to third determination temperatures T1 to T3 in a case where the refrigerant is R32 are smaller than the respective first to third determination temperatures T1 to T3 in a case where the refrigerant is R410A when the driving frequency f and the outside air temperature To are the same. It is decided that the respective first to third determination temperatures T1 to T3 are to be smaller values in a case where the refrigerant is R32 since the difference in temperature between the temperature of the inside of the compressor 31 and the discharge pipe temperature Tt increases more in a case where the refrigerant is R32 than in a case where the refrigerant is R410A. R32 is a refrigerant where the ratio of specific heat κ is larger than for R410A. Typically, a larger difference in temperature between the temperature of the inside of the compressor 31 and the discharge pipe temperature Tt is caused as the ratio of specific heat κ of the refrigerant is larger.

(2-4-3) Input Section

The input section 43 is configured to be input various types of information which includes the types of refrigerant which is being used and various types of operating conditions.

(3) Processing Related to Protection Control and Processing Related to Determination Temperature Modifying Control Processing which relates to protection control and processing which relates to determination temperature modifying control in the air conditioning device 1 will be described below. Protection control is control for protecting the compressor 31 during operation from breakages and the like being caused due to overheating. Determination temperature modifying control is control for modifying the first to third temperatures T1 to T3 which are used as references for determining when the protection control section 41c decides on whether or not protection control is to be performed and the content of protection control based on the discharge pipe temperature Tt.

(3-1) Processing related to Protection Control

Figure 4:
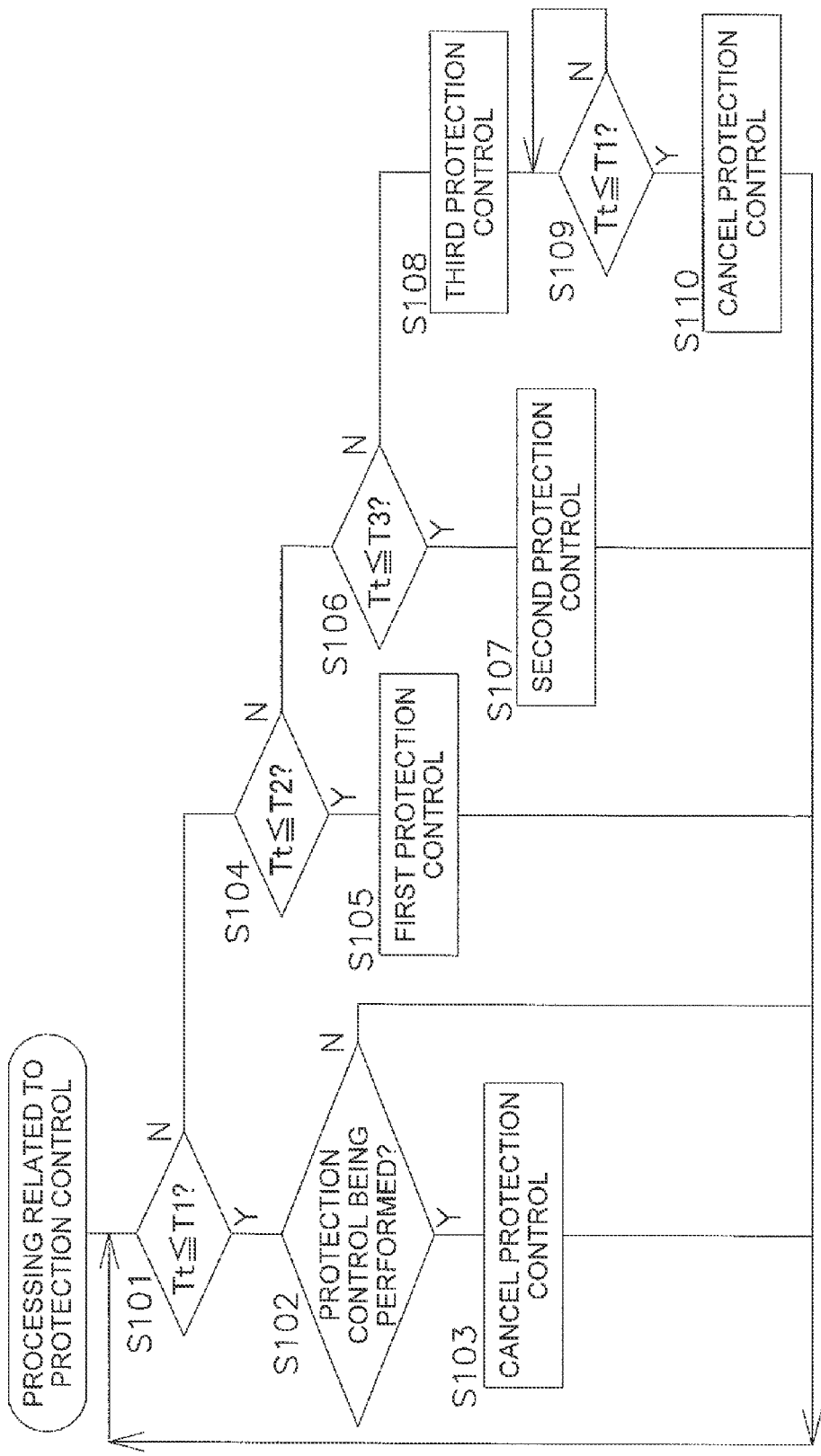
FIG. 4 is a flow chart of processing related to protection control of a compressor in the air conditioning device in FIG. 1.

The processing which relates to protection control will be described based on the flow chart in FIG. 4.

In step S101, it is determined whether or not the discharge pipe temperature Tt is equal to or less than the first determination temperature T1 which is stored in the determination temperature memory area 42a by the protection control section 41c. In a case where it is determined that the discharge pipe temperature Tt is equal to or less than the first determination temperature T1, the processing proceeds to step S102, and in a case where it is determined that the discharge pipe temperature Tt is larger than the first determination temperature T1, the processing proceeds to step S104.

In step S102, it is determined by the protection control section 41c whether or not the first protection control or the second protection control is being performed. In a case where it is determined that protection control is being performed, the processing proceeds to step S103, and in a case where it is determined that protection control is not being performed, the processing returns to step S101.

In step S103, the protection control section 41c cancels a performance of protection control. More specifically, the protection control section 41c instructs the compressor control section 41b to cancel the performance of protection control if the first protection control is being performed and instructs the compressor control section 41b and the outdoor expansion valve 36 to cancel the performance of protection control if the second protection control is being performed. After this, the processing returns to step S101.

In step S104, it is determined whether or not the discharge pipe temperature Tt is equal to or less than the second determination temperature T2 which is stored in the determination temperature memory area 42a by the protection control section 41c. In a case where it is determined that the discharge pipe temperature Tt is equal to or less than the second determination temperature 12, the processing proceeds to step S105, and in a case where it is determined that the discharge pipe temperature Tt is larger than the second determination temperature T2, the processing proceeds to step S106.

In step S105, the first protection control is performed by the protection control section 41c. The first protection control is control where the driving frequency f of the compressor 31 is reduced. The protection control section 41c instructs the compressor control section 41b to lower the driving frequency f to the prescribed driving frequency fp. After this, the processing returns to step S101.

Here, in a case where the first protection control is already being performed, the first protection control continues without any changes. In this case, the protection control section 41c does not reinstruct the compressor control section 41b to reduce the driving frequency f.

In addition, in a case where the second protection control is being performed, performance of the second protection control is cancelled and the first protection control is performed. As the control in practice, the protection control section 41c instructs the outdoor expansion valve 36 to cancel the performance of the protection control. Due to this, the first protection control is executed.

In step S106, it is determined whether or not the discharge pipe temperature Tt is equal to or less than the third determination temperature T3 which is stored in the determination temperature memory area 42a by the protection control section 41c. In a case where it is determined that the discharge pipe temperature Tt is equal to or less than the third determination temperature T3, the processing proceeds to step S107, and in a case where it is determined that the discharge pipe temperature Tt is larger than the third determination temperature T3, the processing proceeds to step S108.

In step S107, the second protection control is performed by the protection control section 41c. The second protection control is control where the opening degree of the outdoor expansion valve 36 is increased while the driving frequency f of the compressor 31 is reduced. More specifically, the protection control section 41c instructs the compressor control section 41h to lower the driving frequency f to the prescribed driving frequency fp and instructs the outdoor expansion valve 36 to increase the opening degree Op to the prescribed opening degree Opp. After this, the processing returns to step S101.

Here, in a case where the second protection control is already being performed, the second protection control continues without any changes. In this case, the protection control section 41c does not reinstruct the compressor control section 41b and the outdoor expansion valve 36.

In addition, in a case where the first protection control is being performed, performance of the first protection control is cancelled and the second protection control is performed. As the control in practice, the protection control section 41c instructs the outdoor expansion valve 36 to modify the opening degree Op to the opening degree Opp. Due to this, the second protection control is executed.

In step S108, the third protection control is performed by the protection control section 41c. In the third protection control, operation of the compressor 31 is stopped. More specifically, the protection control section 41c instructs the compressor control section 41b to stop the operation of the compressor 31. As a result, the refrigerant circuit 10 becomes a state where the refrigerant does not flow. After this, the processing proceeds to step S109.

In step S109, it is determined whether or not the discharge pipe temperature Tt is equal to or less than the first determination temperature T1 which is stored in the determination temperature memory area 42a by the protection control section 41c. Step S109 is repeated until it is determined that the discharge pipe temperature Tt is equal to or less than the first determination temperature T1. When it is determined that the discharge pipe temperature Tt is equal to or less than the first determination temperature T1, the processing proceeds to S110.

In step S110, the protection control section 41c cancels the protection control. More specifically, the protection control section 41c instructs the compressor control section 41b to cancel the stopping of the compressor 31. In addition, in a case where it has been instructed to the compressor control section 41b to reduce the driving frequency f to the prescribed driving frequency fp and/or in a case where it has been instructed to the outdoor expansion valve 36 to increase the opening degree Op to the prescribed opening degree Opp, the protection control section 41c instructs the compressor control section 41b and/or the outdoor expansion valve 36 to cancel this control. After this, the processing returns to step S101.

(3-2) Processing Related to Determination Temperature Modifying Control

The processing which relates to determination temperature modifying control is performed during operation of the compressor 31. The processing related to determination temperature modifying control will be described based on the flow charts in FIG. 5a and FIG. 5b.

Figure 5A:
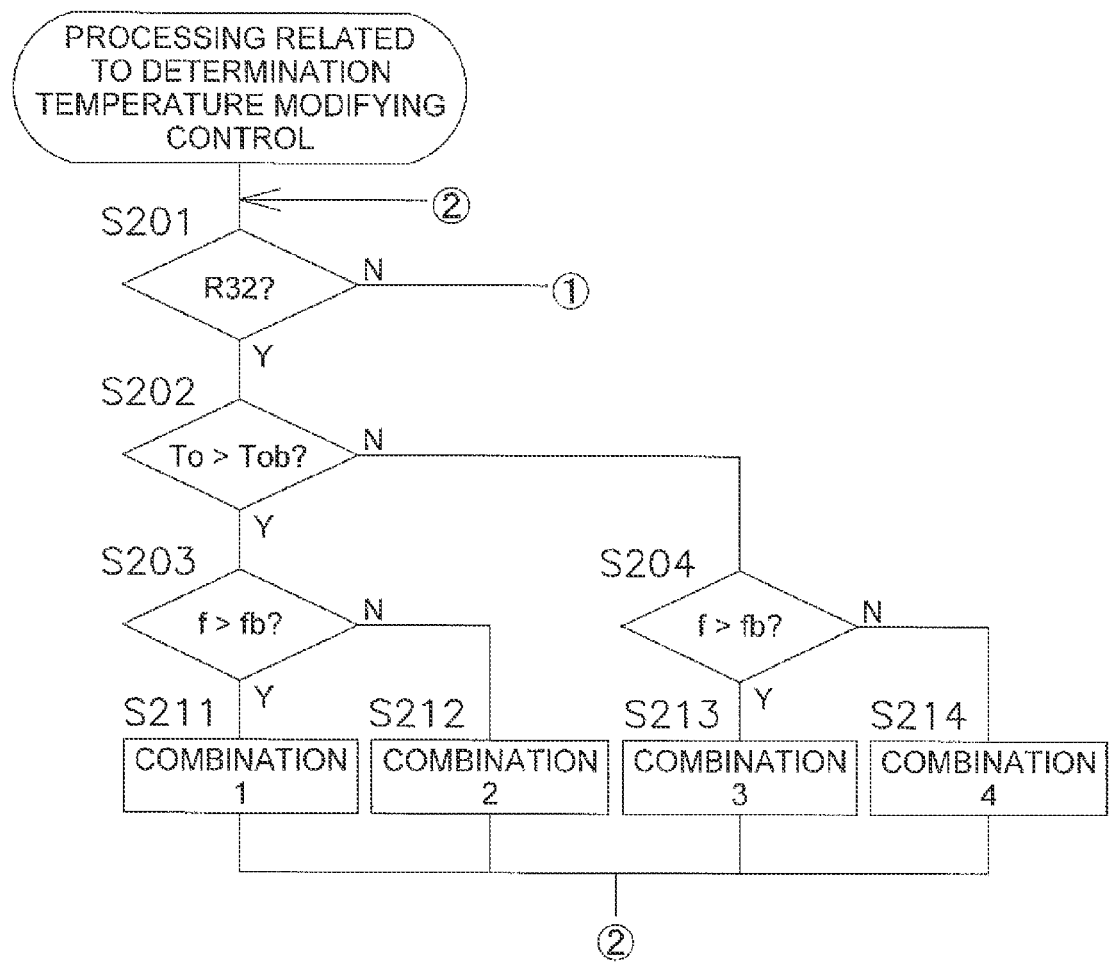
FIG. 5a is a flow chart of processing which relates to modifying control of the determination temperatures for the protection control of the compressor in the air conditioning device in FIG. 1 (step S201 to step S204 and step S211 to step S214).
Figure 5B:
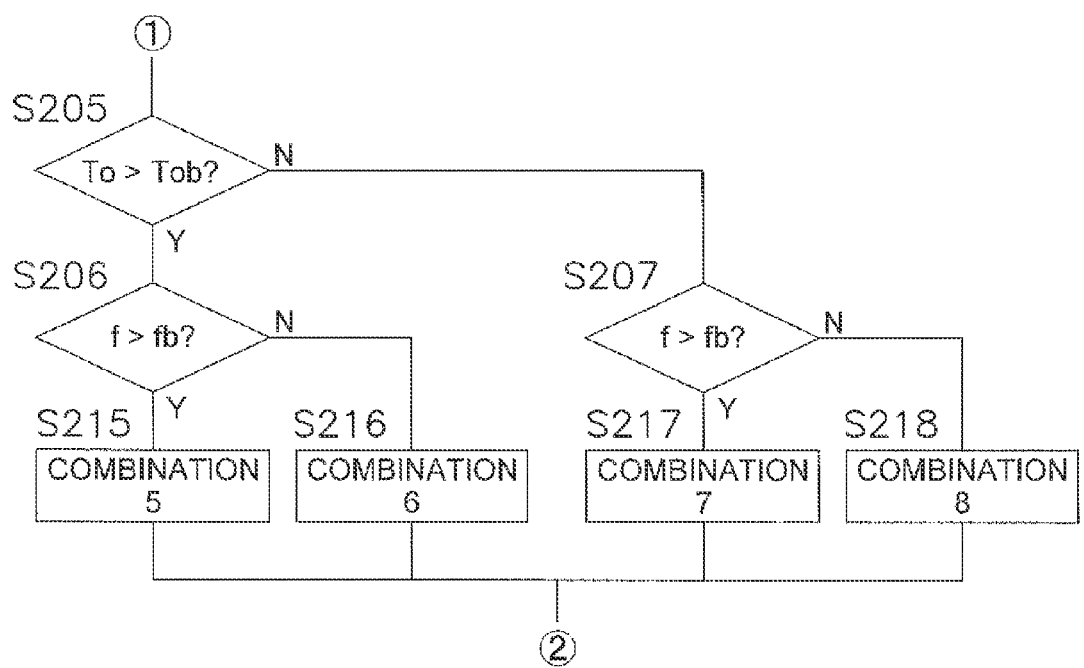
FIG. 5b is a flow chart of processing which relates to modifying control of the determination temperatures for the protection control of the compressor in the air conditioning device in FIG. 1 (step S205 to step S207 and step S215 to step S218).

In FIG. 5a and FIG. 5b, since step S204 is similar to S203, step S205 to step S207 are respectively similar to step S202 to step 204, and step S212 to step S218 are similar to step S211, the description thereof is omitted.

In step S201, the determination temperature modifying section 41d determines the type of refrigerant using the information which is stored in the refrigerant memory area 42d. In a case where it is determined that the type of refrigerant is R32, the processing proceeds to S202, and in a case where it is determined that the type of refrigerant is R410A, the processing proceeds to S205.

In step S202, the determination temperature modifying section 41d compares the outside air temperature To and the outside air temperature reference value Tob which is stored in the outside air temperature reference value memory area 42c. In a case where it is determined that the outside air temperature To is larger than the outside air temperature reference value Tob, the processing proceeds to step S203 and in a case where it is determined that the outside air temperature To is equal to or less than the outside air temperature reference value Tob, the processing proceeds to step S204.

In step S203, the determination temperature modifying section 41d compares the driving frequency f of the compressor 31 and the frequency reference value fb which is stored in the frequency reference value memory area 42b. In a case where it is determined that the driving frequency f is larger than the frequency reference value fb, the processing proceeds to step S211 and in a case where it is determined that the driving frequency f is equal to or less than the frequency reference value fb, the processing proceeds to step S212.

In step S211, the determination temperature modifying section 41d modifies the first to third determination temperatures T1 to T3, which are stored in the determination temperature memory area 42a, to the combination 1 in FIG. 3 (the combination of the first to third determination temperatures T1 to T3 which correspond to a case where the refrigerant is R32, the outside air temperature To is larger than the outside air temperature reference value Tob, and the driving frequency f is larger than the frequency reference value fb) which is stored in the temperature data memory area 42e. After this, the processing returns to step S201. Here, in a case where the combination 1 is already stored in the determination temperature memory area 42a, the combination 1 is maintained in the determination temperature memory area 42a without any changes.

(4) Features (4-1)

The air conditioning device 1 in the present embodiment is provided with the refrigerant circuit 10, the discharge pipe temperature sensor 51, the protection control section 41c, and the determination temperature modifying section 41d. The refrigerant circuit 10 includes the compressor 31 which compresses the refrigerant. The discharge pipe temperature sensor 51 detects the temperature of the refrigerant which is discharged from the compressor 31 outside the compressor 31 (at the discharge pipe 82). The protection control section 41c performs the first to third protection control (protection control) for the compressor 31 in a case where the discharge pipe temperature Tt which is detected by the discharge pipe temperature sensor 51 exceeds the first to third determination temperatures T1 to T3. The determination temperature modifying section 41d modifies the first to third determination temperatures T1 to T3 according to information on the outside air temperature To and information on the type of refrigerant.

Due to this, the protection control is performed based on the first to third determination temperatures T1 to T3 which are appropriate even in a case where the difference in temperatures between the temperature of the inside of the compressor 31 and the temperature of refrigerant which is detected outside the compressor 31 changes due to the outside air temperature To or the type of refrigerant. As a result, the air conditioning device 1 which is highly reliable is realized.

(4-2)

In the air conditioning device 1 in the present embodiment, the determination temperature modifying section 41d modifies the first to third determination temperatures T1 to T3 to be smaller values as the outside air temperature To falls (in cases where the type of refrigerant and the driving frequency f are the same).

Here, appropriate protection control is performed regardless of the outside air temperature To before the inside of the compressor 31 overheats since the first to third determination temperatures T1 to T3 are modified to be smaller values in a case where the outside air temperature falls and there is an increase in the difference in temperatures between the temperature of the inside of the compressor 31 and the temperature of refrigerant outside the compressor 31. As a result, the air conditioning device 1 which is highly reliable is realized.

(4-3)

In the air conditioning device 1 in the present embodiment, the determination temperature modifying section 41*d* modifies the first to third determination temperatures T1 to T3 to be smaller values as the ratio of specific heat κ of the refrigerant is larger, that is, in a case where the refrigerant is R32 and not R410A (in cases where the driving frequency f and the outside air temperature To are the same).

Generally, the difference in temperatures between the temperature of the inside of the compressor 31 and the temperature of refrigerant outside the compressor 31 is larger as the ratio of specific heat κ of the refrigerant is larger. With regard to this, appropriate protection control is executed regardless of the type of refrigerant before the inside of the compressor 31 overheats since the first to third determination temperatures T1 to T3 are modified to be smaller values as the ratio of specific heat κ of the refrigerant is larger. As a result, the air conditioning device 1 which is highly reliable is realized.

(4-4)

In the air conditioning device 1 in the present embodiment, the compressor 31 is an inverter control compressor which can vary the driving frequency f. The determination temperature modifying section 41*d* further modifies the first to third determination temperatures T1 to T3 according to the driving frequency f.

The difference in temperatures between the temperature of the inside of the compressor 31 and the temperature of refrigerant outside the compressor 31 changes according to the driving frequency f since the amount of refrigerant which circulates in the compressor 31 changes according to the driving frequency f of the compressor 31. However, since the first to third determination temperatures T1 to T3 are modified according to the driving frequency f, appropriate protection control is performed before the inside of the compressor 31 overheats. As a result, the air conditioning device 1 which is highly reliable is realized.

(4-5)

In the air conditioning device 1 in the present embodiment, the refrigerant circuit 10 further includes the outdoor expansion valve 36 where the opening degree is adjustable. The determination temperatures for the protection control includes three types of determination temperatures (the first determination temperature T1, the second determination temperature T2 which is larger than the first determination temperature T1, and the third determination temperature T3 which is larger than the second determination temperature T2). The protection control section reduces the driving frequency f of the compressor 31 (first protection control) in a case where the discharge pipe temperature Tt exceeds the first determination temperature T1, increases the opening degree Op of the outdoor expansion valve 36 (second protection control) in a case where the discharge pipe temperature Tt exceeds the second determination temperature T2, and stops the compressor 31 (third protection control) in a case where the discharge pipe temperature Tt exceeds the third determination temperature T3.

Here, since the content of the protection control is changed according to the discharge pipe temperature Tt based on the first to third determination temperatures T1 to T3 which are appropriately set, it is possible to realize more precise protection control according to the circumstances and the air conditioning device 1 which is highly reliable is realized.

(5) Modified Examples

Modified examples of the present embodiment are shown below. A plurality of the modified examples may be appropriately combined.

(5-1) Modified Example A

In the embodiment described above, the air conditioning device 1 can switch the refrigerant between R32 and R410A, but the present invention is not limited to this.

These refrigerants are examples and other refrigerants may be used. In addition, for example, an air conditioning device may be configured to use three or more types of refrigerant.

Furthermore, an air conditioning device may be configured to use only one type of refrigerant. In this case, modification of the first to third determination temperatures T1 to T3 according to the type of refrigerant is not performed.

(5-2) Modified Example B

In the embodiment described above, the first to third determination temperatures T1 to T3 are modified according to the type of refrigerant which is being used and the outside air temperature To, but the present invention is not limited to this and the first to third determination temperatures T1 to T3 may be modified according to the type of refrigerant which is being used or the outside air temperature To.

However, it is desirable that the first to third determination temperatures T1 to T3 are modified according to both the type of refrigerant which is being used and the outside air temperature To in order to perform more appropriate protection control.

(5-3) Modified Example C

In the embodiment described above, the first to third protection control are executed as the protection control, but the present invention is not limited to this and more types of protection control may be performed.

In addition, there may be two or fewer types of protection control but it is desirable that all of the first to third protection control are performed in order to realize more precise protection control.

(5-4) Modified Example D

In the embodiment described above, the determination temperature modifying section 41*d* modifies the combination of the first to third determination temperatures T1 to T3 in the determination temperature memory area 42*a* to the combination of the first to third determination temperatures T1 to T3 which is stored in the temperature data memory area 42*e*, but the present invention is not limited to this.

For example, the determination temperature modifying section 41*d* may calculate the first to third determination temperatures T1 to T3 which are used by the protection control section 41*c* using a function where the outside air temperature To and the driving frequency f are variables (a function where the respective first to third determination temperatures T1 to T3 become smaller values as the outside air temperature To falls and as the driving frequency f is reduced). In addition, a plurality of functions may be prepared according to the types of refrigerant.

(5-5) Modified Example E

In the embodiment described above, the determination temperature modifying section 41*d* modifies the first to third determination temperatures T1 to T3 to be smaller values as the ratio of specific heat κ of the refrigerant is larger, but instead of this, the first to third determination temperatures T1 to T3 may be modified to be smaller values as the specific heat of the refrigerant is lower.

(5-6) Modified Example F

In the embodiment described above, the type of refrigerant is determined each time (step S201) by the determination temperature modifying section 41d in the processing related to the determination temperature modifying control, but the present invention is not limited to this. Determining of the type of refrigerant may be performed only when the type of refrigerant is changed through the input section 43.

(5-7) Modified Example G

In the embodiment described above, the protection control is not cancelled until the discharge pipe temperature Tt becomes equal to or less than the first determination temperature T1 after the third protection control is performed, but the present invention is not limited to this. For example, the third protection control may be cancelled and operation of the compressor 31 may be restarted if the discharge pipe temperature Tt becomes lower than the third determination temperature T3.

(5-8) Modified Example H

In the embodiment described above, the compressor 31 is an inverter compressor which can vary the driving frequency f, but the present invention is not limited to this and the compressor 31 may be a non-invertor compressor (which can not vary the driving frequency f). In this case, the protection control to change the driving frequency f and modification of the determination temperatures according to the driving frequency f are not executed.

(5-9) Modified Example I

In the embodiment described above, control where the opening degree Op of the outdoor expansion valve 36 is increased to the opening degree Opp is performed during the second protection control, but the present invention is not limited to this and control of the opening degree of the indoor expansion valve 23 may be performed.

INDUSTRIAL APPLICABILITY

According to the present invention, a highly reliable refrigerating device is realized where appropriate protection control for a compressor is performed regardless of the outside air temperature or the type of refrigerant which is used in the refrigerating device.

What is claimed is:

1. A refrigerating device comprising:
a refrigerant circuit including a compressor arranged and configured to compress a refrigerant and an expansion valve in which an opening degree is adjustable;
a temperature detecting section arranged and configured to detect a temperature of the refrigerant discharged from the compressor on an outside of the compressor;
a protection control section configured to compare the detection temperature detected by the temperature detecting section to a first determination temperature, a second determination temperature larger than the first determination temperature, and a third determination temperature larger than the second determination temperature, and to perform a protection control of the compressor by:
reducing the driving frequency of the compressor in a case where the detection temperature exceeds the first determination temperature but does not exceed the second determination temperature,
increasing the opening degree of the expansion valve in a case where the detection temperature exceeds the second determination temperature but does not exceed the third determination temperature, and
stopping the compressor in a case where the detection temperature exceeds the third determination temperature; and
a determination temperature modifying section configured to modify the determination first, second and third temperatures according to at least one of information on an outside air temperature and information on a type of the refrigerant, the first, second, and third determination temperatures being modified so that a temperature inside the compressor is maintained under a predetermined overheating temperature of the compressor,
the compressor being an inverter control compressor capable of varying driving frequency, and
the determination temperature modifying ng section further modifying the determination temperature according to the driving frequency.

2. The refrigerating device according to claim 1, wherein the determination temperature modifying section modifying the determination temperature to be a smaller value as the outside air temperature falls.

3. The refrigerating device according to claim 1, wherein the determination temperature modifying section modifying the determination temperature to be a smaller value as a ratio of specific heat of the refrigerant is larger.

4. The refrigerating device according to claim 1, wherein the determination temperature modifying section modifying the determination temperature to be a smaller value as the driving frequency is smaller.

5. The refrigerating device according to claim 1, wherein the temperature detecting section arranged and configured to detect an instantaneous temperature of the refrigerant discharged from the compressor on an outside of the compressor.

* * * * *

UNITED STATES PATENT AND TRADEMARK OFFICE
CERTIFICATE OF CORRECTION

| | |
|---|---|
| PATENT NO. | : 9,523,525 B2 |
| APPLICATION NO. | : 14/407034 |
| DATED | : December 20, 2016 |
| INVENTOR(S) | : Akinori Nakai et al. |

It is certified that error appears in the above-identified patent and that said Letters Patent is hereby corrected as shown below:

In the Claims

Claim 1 in Column 18, Line 31:
"the determination temperature modifying ng section"
Should read:
-- the determination temperature modifying section --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*